Patented Nov. 20, 1923.

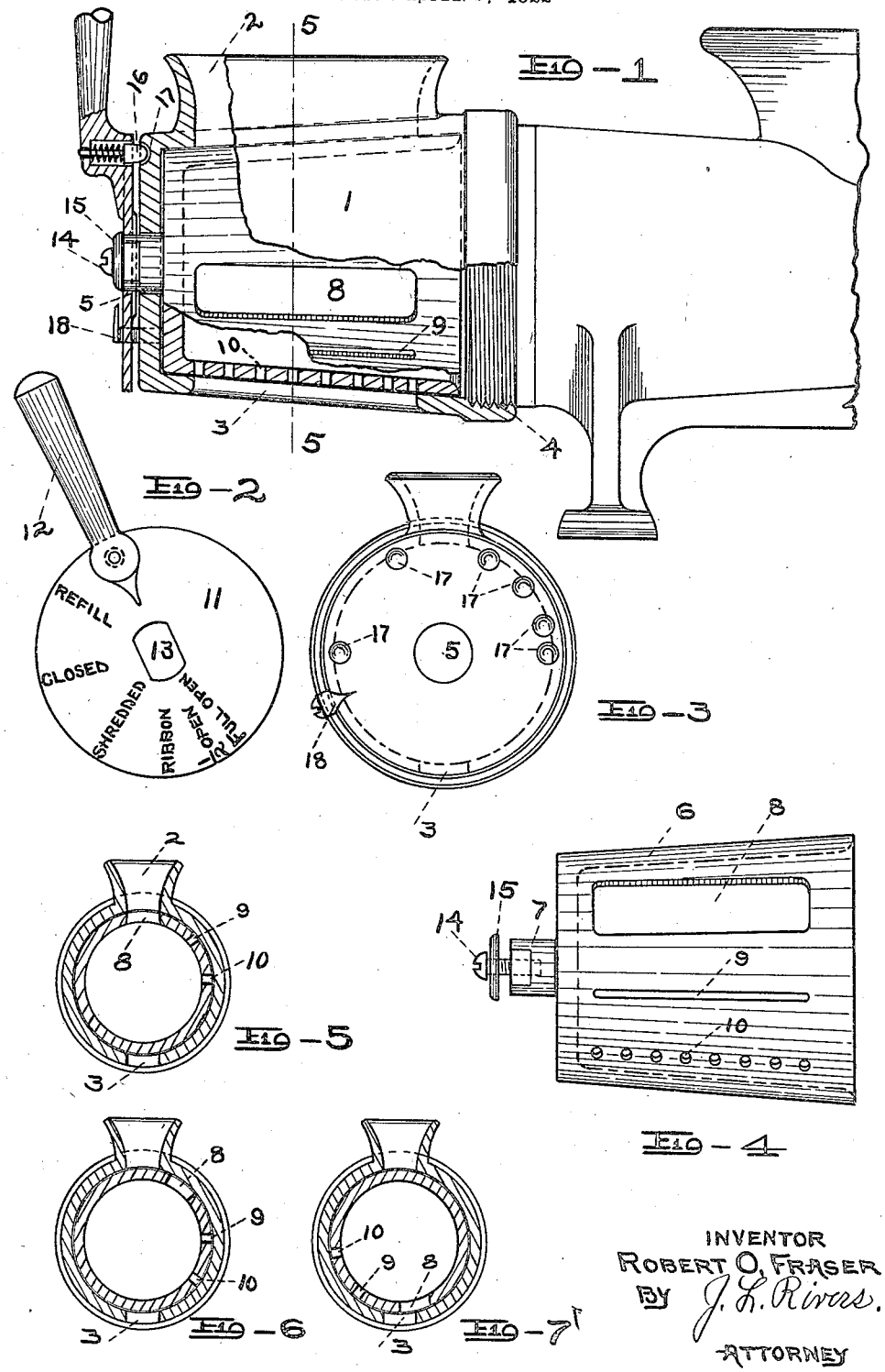

1,474,773

UNITED STATES PATENT OFFICE.

ROBERT O. FRASER, OF SEATTLE, WASHINGTON.

FOOD DISPENSER.

Application filed April 3, 1922. Serial No. 549,235.

*To all whom it may concern:*

Be it known that I, ROBERT O. FRASER, a citizen of the United States, residing at Seattle, in the county of King and State of Washington, have invented a new and useful Food Dispenser, of which the following is a specification.

My invention relates particularly to improvements in devices for dispensing food in plastic condition; and the objects of my improvements are, to provide mechanism attachable to the discharge portion of a meat grinder, or the like, whereby such food may be distributed in various quantities and forms, including layers and shreds adapted to be deposited in a horizontal position, if desired; to provide a hopper through which any excess portions discharged from the device may be replaced therein; and, to provide an indicator, and means cooperating therewith, to instantly adjust the machine to the cut required, to connect the hopper with the material contained in the device or disconnect it therefrom, or to close the same.

The accompanying drawings illustrate an embodiment of my invention, and wherein—

Figure 1 is a side elevation of the device, as attached to the discharge end of a meat grinder, and the tumbler, disc carrying indicia for stops and its handle and pawl, being shown partly in section.

Fig. 2, a front elevation of said disc and handle.

Fig. 3, a front end elevation of the body, showing the hopper, the indicator, and circular outlined recesses adapted to engage the pawl of the handle.

Fig. 4, a side elevation of the tumbler, showing a stud to which said disc is attachable, also a large opening for dispensing said plastic material, a narrow slot for spreading, and a plurality of longitudinal openings for shredding the same.

Fig. 5, a cross-section on the line 5—5 of Fig. 1, showing the tumbler in position for replacement of material in the device, through the hopper; the other openings of the tumbler being closed.

Fig. 6, a cross-section of the same, showing the device entirely closed.

Fig. 7, a cross-section of the same, indicating the device at half open position, the slot for spreading and the openings for shredding shown as closed.

The body 1, having a hollow frusto-conical interior, is provided at its upper portion with a hopper 2, and at its lower portion with a longitudinal opening 3, its rear open end interiorly threaded for attachment to the discharge end of a meat grinder, as denoted by 4, and its forward closed end having an axial circular outlined opening 5. 6 designates what I term the tumbler. It is hollow, of a form complementary to the interior of the body and rotatable therein. When in operative position its larger open end extends to the threaded portion of the body, and its smaller closed end is journaled in the opening 5 in the forward end of the body through the stud 7 with which said smaller end is provided. 8 denotes an opening in the tumbler, adapted to align with the opening 3 in the body, for dispensing large portions of material from the device; 9, a slot for spreading said material, and 10, longitudinal openings for shredding the same.

With the tumbler assembled in the body, as shown in Fig. 1, the disc 11, carrying certain indicia, and a handle 12, preferably of integral construction, is keyed to the stud 7, through its central opening 13, and secured in place by the screw 14 and washer 15. 16 denotes a pawl carried by the handle and adapted to engage the recesses 17 located in the forward end of the body, to hold the tumbler in a predetermined position when rotated by the handle. 18 designates an indicator secured to the side of the body and extending over the disc, as shown in Fig. 1.

In utilizing the device, it is secured to the discharge end of a meat grinder, as indicated in Fig. 1. In the present embodiment it is shown in threaded engagement therewith, but it is evident that other means of attachment can be used, if desired, and in connection with other machines having means for expelling foods in plastic condition.

If it is desired to set the device for spreading the material in ribbon-like form, the handle is moved until the indicator points to the word "Ribbon" and the pawl engages in the adjacent recess 17, thus bringing the narrow slot 9 in a central position over the larger slot 3 in the body, and insuring its positive retention in place. As material is discharged from the grinder and the tumbler becomes filled, the material will be dispensed from the device in the form of a thin layer or ribbon—useful in spreading sandwiches or distributing a small quantity. Similar steps are followed in adjusting the mechanism to dispense the material in shredded form as indicated by "Shredded" on the disc, and "Full open" for the larger quantities, or "½ open" for smaller quantities; this latter adjustment being shown in Fig. 7.

The hopper 2 performs a useful function in that, should more of the material be dispensed than required, the turning of the disc so that the word "Refill" comes in position with the indicator will bring the longitudinal opening 8 of the tumbler in alignment with the hopper, as indicated in Fig. 5, permitting the excess material to be returned to the tumbler. Fig. 6 illustrates the tumbler so turned as to completely close the device, which is effected by bringing the disc to the indicator at the point marked "Closed," thus protecting the contents of the tumbler when the device is not in use.

The recesses in the front of the body are so spaced with reference to the indicator and the indicia on the disc as to engage the pawl and retentively hold the tumbler in position to effect the operations herein described. The construction of this device not only permits the material to be dispensed in quantities suitable for retail purposes, adapting it to the use of merchants, but also in smaller quantities, and in various forms, to meet the requirements of individual users.

I claim:

1. In a meat grinder, a body, attachable to the discharge end thereof, having a hopper and a discharge opening, a hollow tumbler rotatably mounted in the body and communicating with said end, having a plurality of longitudinal slots and a plurality of longitudinally extending openings, in spaced relation, adapted to communicate with said opening, a disc mounted to said tumbler, and rotatable therewith, carrying means for identifying said slots and openings in the tumbler, a handle for rotating the disc and tumbler, a pawl in the handle, openings in the adjacent end of the body to engage the pawl, and an indicator cooperating with said means to denote connection of said slots and openings with the discharge opening of the body, and connection with the hopper.

2. In a machine having a discharge opening for foods in plastic condition, a hollow body connected with said opening and provided in its lower portion with a longitudinal slot, a hollow member rotatably mounted in the body and communicating with said opening, having a plurality of longitudinal openings in spaced relation, a disc connected with said member and rotatable therewith, carrying indicia, an indicator cooperating with said indicia, whereby each of said longitudinal openings may be placed in communication with said slot, and means for rotating the disc.

3. In combination with a machine for dispensing foods in plastic condition, a spout, attachable to the discharge opening of said machine, a hollow member journaled in the spout and communicating with said opening, having a plurality of openings of different widths and forms in spaced relation, an indicator, and means cooperating therewith, whereby said member may be turned to any predetermined position and any of said openings placed in communication with the discharge portion of the spout.

4. In a machine for dispensing foods in plastic condition, a spout having a hollow rotatable member journaled therein provided with a plurality of openings adapted to communicate with the discharge opening of the spout and dispense said foods in the form of thick portions, shreds, or thin layers.

5. In a machine for dispensing foods in plastic condition, a spout having a rotatable member adapted to dispense said foods in layers and shreds, including a hopper whereby excess material so dispensed may be replaced in the spout.

6. In a machine for dispensing foods in plastic condition, provided with a spout having a rotatable member adapted to dispense said foods in ribbon-like layers or shreds, the combination of a disc, fixedly connected with said member, carrying indicia, means for rotating the disc, and an indicator cooperating therewith, whereby said member may be readily turned to a predetermined position and said food so distributed from the spout.

ROBERT O. FRASER.